United States Patent [19]

Shea, Jr.

[11] 4,312,763

[45] Jan. 26, 1982

[54] PROCESS FOR REMOVAL OF SOLIDS FROM SOLVENT REFINED COAL SOLUTIONS

[75] Inventor: Frederick L. Shea, Jr., Johnson City, Tenn.

[73] Assignee: Great Lakes Carbon Corporation, New York, N.Y.

[21] Appl. No.: 138,141

[22] Filed: Apr. 7, 1980

[51] Int. Cl.$^3$ ............................................... B01D 37/02
[52] U.S. Cl. .................................. 210/777; 208/8 LE
[58] Field of Search ............ 208/8 LE; 210/777, 778, 210/500.1, 502–504

[56] References Cited

U.S. PATENT DOCUMENTS

| | | | |
|---|---|---|---|
| 2,812,246 | 11/1957 | Martin | 52/1 |
| 2,868,695 | 1/1959 | Shea | 202/9 |
| 2,872,305 | 2/1959 | Shea | 52/1 |
| 3,171,720 | 3/1965 | Shea et al. | 23/209.2 |
| 3,173,769 | 3/1965 | Martin et al. | 44/6 |
| 3,271,924 | 9/1966 | Gramm et al. | 53/29 |
| 4,032,428 | 6/1977 | Johnson | 208/8 LE |
| 4,046,690 | 9/1977 | Rodgers | 210/777 X |

*Primary Examiner*—Thomas G. Wyse
*Attorney, Agent, or Firm*—R. Laddie Taylor

[57] ABSTRACT

A method for separating solids from a liquefied coal slurry resulting from the SRC process utilizes an improved carbon filteraid material prepared by flash heating thermally expandable coal particles under controlled conditions.

10 Claims, No Drawings

PROCESS FOR REMOVAL OF SOLIDS FROM SOLVENT REFINED COAL SOLUTIONS

BACKGROUND OF THE INVENTION

The invention relates to the solvent refined coal process and the use of an improved filteraid material for removing undissolved solids from the liquefied coal slurry resulting therefrom.

One process for the solvent refining of coal generally comprises reaction of a coal/solvent mixture with a reducing gas at high temperature and pressure. After reaction, the resulting liquefied coal slurry is treated to remove a substantial portion of undissolved solids contained therein. These undissolved solids, which include mineral matter, carbonaceous residue and other insoluble material, frequently have a particle size in the micron and submicron range.

One means currently employed for removing these undissolved solids from the liquefied coal slurry is a pressure filtration system. Such systems, which may be of the batch, cyclic or continuous filtration types known in the art, include a support means, such as a screen or the like, for receiving a coating of filteraid material thereon capable of retaining the solids from the coal slurry. One method of utilizing a pressure filtration system is the "pre-coat" procedure, wherein an appropriate amount of filteraid material is deposited on the support prior to passing the coal slurry to be filtered therethrough. This is conventionally accomplished by mixing the material with previously filtered coal liquid or other suitable liquid hydrocarbons and passing the mixture through the support. A second method for utilizing a pressure filtration system is the "body feed" procedure, wherein an appropriate amount of filteraid material is added to the coal slurry to be filtered prior to passing the slurry through the support, whereby the filteraid material and other suspended matter in the slurry are allowed to "build up" on the support to produce a filter cake. The presence of the filteraid in the cake renders it more permeable while retaining dispersed solids. A combination of these procedures may also be employed.

SUMMARY OF THE INVENTION

The broad embodiment of the invention provides a method for separating solids from a liquefied coal solution or slurry resulting from the solvent refining of coal comprising passing the coal solution or slurry through a pressure filtration system including a support means to receive a coating of filteraid material thereon capable of retaining solids from the coal slurry, in which the filteraid material utilized in the filtration system consists of finely divided partially devolatilized coal particles wettable by the coal slurry and having a cake density no more than about 25 lb/ft$^3$ (400.5 kg/m$^3$), the partially devolatilized coal particles being prepared by flash heating finely divided thermally expandable coal particles to a temperature in the range of about 620° C. to about 1100° C. in an atmosphere containing oxygen. The pressure filtration system may employ the "pre-coat" or "body feed" procedures or a combination thereof, as previously described.

Preferably, the volatile matter value of the partially devolatilized coal particles following flash heating is no less than about 25% of the initial volatile matter value of the expandable coal particles.

In one embodiment of the invention, the unburned volatile matter expelled from the thermally expandable coal particles during the flash heating process is recovered and recycled to the process for the solvent refining of coal.

DETAILED DESCRIPTION OF THE INVENTION

Any finely divided thermally expandable coal characterized by softening and bloating when heated to temperatures in the range of about 620° C. to about 1100° C. in an atmosphere containing oxygen and which will swell when some of the volatile matter of each particle is driven off at a sufficiently high rate is acceptable as feed material for the partial devolatilization process. The term "finely divided" as used throughout the specification and claims refers to particle sizes below about 65 mesh (Tyler Screen Scale).

One requirement of the carbon filteraid material of the invention is that it must possess a cake density of no more than about 25 lb/ft$^3$ (400.5 kg/m$^3$), and preferably within the range of about 10 to about 16 lb/ft$^3$ (160.2 to 256.3 kg/m$^3$). Partially devolatilized coal particles having a cake density above about 25 lb/ft$^3$ do not possess adequate filtering characteristics for use in the removal of micron and submicron solids from a liquefied coal slurry at reasonable flow rates.

The cake density value of a dry particulate material may be determined by mixing a weighed sample of the material with water, agitating, and passing the resulting suspension through a screen or cloth filter, usually under a mild suction, and calculating the cake density value, traditionally expressed in lb/ft$^3$ or kg/m$^3$, from the volume of the resulting filter cake and the dry weight of the sample. In view of the fact that the carbon filteraid used in carrying out the invention is ordinarily not wettable by water, a few drops of a wetting agent must be added to the water used in the determination of its cake density.

Although not an absolute requirement, high volatile coal (above about 30 wt. % volatile matter content) is preferred as feed material in the solvent refining (SRC) process based on economics, yields of SRC product and ease of processing. The feed coal for the partial devolatilization process herein disclosed to produce the carbon filteraid material used in carrying out the invention may be either high, medium or low (less than about 20 wt. %) volatile coal. It is a feature of the invention that the same source of thermally expandable coal particles may be utilized, following particle size classification if necessary, to produce the feed for the partial devolatilization process and the feed for the SRC process.

It is another feature of the invention that thermally expandable coal particles may be milled and classified to a particle size range of about 100 mesh to no more than about 75% below 325 mesh prior to flash heating, the particles larger than this size range being further milled to a suitable particle size (e.g., about 95%<200 mesh) and utilized as feed in the solvent refining process, the particles smaller than this range being directly utilized as SRC feed material.

The term "flash heating" as used herein refers to a method whereby finely divided thermally expandable coal particles are treated at a temperature in the range of about 620° C. to about 1100° C. and preferably in the range of about 870° C. to about 930° C. (particle surface temperature) at a very rapid upheat rate, estimated to be in excess of about 1000° C. per second, in air or an atmosphere containing air or other oxygen-containing gas.

It has been found desirable to carry out the flash heating process in an atmosphere containing oxygen such that there is about 2.0 to about 4.0 standard ft$^3$ of oxygen available per pound (124.9 to 249.7 cm$^3$/g) of thermally expandable coal particles. With oxygen supplied in this amount, the process is self-sustaining while permitting expansion of the coal particles at a rapid rate, but is inadequate to permit more than a minimum burning of the individual expanded particles. The oxygen requirement to produce an acceptable cake density varies somewhat depending on the volatile matter content of the thermally expandable coal particles, with the higher volatile matter content feed requiring a somewhat greater oxygen supply.

A required feature of the invention is that the carbon filteraid be substantially completely wettable in the liquefied coal slurry from the solvent refining of coal. Wettability may be determined by placing a small quantity of the filteraid material in a sample of filtered liquefied coal solution and vigorously agitating the mixture for a short time (e.g., 30 seconds). If the filteraid is readily dispersed and suspended in the liquid, it is said to be wettable.

DESCRIPTION OF THE PREFERRED EMBODIMENT

East Gulf bituminous coal particles (17.6 wt. % volatile matter content), substantially all particles having a size less than 100 mesh and also about 60% below 325 mesh, are flash heated by entraining in an air stream and feeding this at a rate of about 11,700 lb/hr (5,307 kg/hr) to the top of a vertical heating reactor about 30 feet (98.4 meters) in length and 10 feet (32.8 meters) in diameter. Secondary air is supplied to the reactor in sufficient quantity to provide an atmosphere having about 2 to 3 standard ft$^3$ of oxygen available per pound (124.9 to 187.3 cm$^3$/g) of feed material and to produce a reactor temperature in the range of about 870° C. to about 930° C., with an upheat rate for the entrained particles of about 1000° C./sec. The expanded product, having an average volatile matter content of about 8 wt. % and an average cake density of about 15 lb/ft$^3$ (240.3 kg/m$^3$), is passed to a cyclone collector having an exhaust port for removal, separation and recovery of the gaseous and vaporous products.

The unburned condensible volatile matter expelled during the partial devolatilization of the coal particles, along with other gaseous and vaporous products formed by reaction of a portion of the volatile matter with air, are passed to a condenser unit from the exhaust port of the cyclone collector, where they are recovered and recycled to the process for the solvent refining of coal by mixing with the liquefaction solvent.

A sample of carbon filtered particles produced by this method is screened to 100% <200 mesh and utilized for filtering a liquefied coal slurry containing about 8% solids resulting from the solvent refining of coal at a dosage of 40 grams filteraid per liter of slurry.

An unscreened sample of the same filteraid material is utilized for filtering an identical liquefied coal slurry at a dosage of 80 grams filteraid per liter of slurry.

The flow rates of the filtrate using the carbon filteraids compared to a base run (no filteraid) carried out under the same conditions as the filteraid trials are shown below.

| Filteraid Dosage in wt. of filteraid/vol. of slurry | Flow Rate of Filtrate in liters/hr./m$^2$ |
| --- | --- |
| None | 23.2 |
| 40 g/l (100% <200 mesh) | 70.4 |
| 80 g/l (unscreened) | 164.8 |

As can be seen from the data, an increase in the flow rate of the filtrate of over threefold in the case of a filteraid dosage of 40 g/l of slurry and over sevenfold in the case of a dosage of 80 g/l, compared to the base run, is realized by utilizing the filteraid of the invention.

While the invention has been described in detail and with reference to a specific embodiment thereof, it will be apparent to one skilled in the art that various changes and modifications can be made therein without departing from the scope and spirit thereof, and, therefore, the invention is not intended to be limited except as indicated in the appended claims.

I claim:

1. In a method for separating solids from a liquefied coal slurry resulting from the solvent refining of coal comprising passing said slurry through a pressure filtration system including a support means to receive a coating of filteraid material thereon capable of retaining solids from said slurry, the improvement which comprises utilizing as the filteraid material in said filtration system finely divided partially devolatilized coal particles wettable by the coal slurry and having a cake density no more than about 25 lb/ft$^3$ (400.5 kg/m$^3$), said partially devolatilized coal particles being prepared by flash heating finely divided thermally expandable coal particles to a temperature in the range of about 620° C. to about 1100° C. in an atmosphere containing oxygen.

2. In a method for separating solids from a liquefied coal slurry resulting from the solvent refining of coal comprising passing said slurry through a pressure filtration system including a support means to receive a coating of filteraid material thereon capable of retaining solids from said slurry, the improvement which comprises utilizing as the filteraid material in said filtration system finely divided partially devolatilized coal particles wettable by the coal slurry and having a cake density no more than about 25 lb/ft$^3$ (400.5 kg/m$^3$), said partially devolatilized coal particles being prepared by flash heating finely divided thermally expandable coal particles to a temperature in the range of about 620° C. to about 1100° C. in an atmosphere containing oxygen, at least a portion of the volatile matter expelled during the partial devolatilization of the thermally expandable coal particles being recovered and recycled to the process for the solvent refining of coal.

3. In a method for separating solids from a liquefied coal slurry resulting from the solvent refining of coal comprising passing said slurry through a pressure filtration system including a support means to receive a coating of filteraid material thereon capable of retaining solids from said slurry, the improvement which comprises utilizing as the filteraid material in said filtration system finely divided partially devolatilized coal particles wettable by the coal slurry and having a cake density in the range of about 10 lb/ft$^3$ (160.2 kg/m$^3$) to about 16 lb/ft$^3$ (256.3 kg/m$^3$), said partially devolatilized coal particles being prepared by flash heating finely divided thermally expandable coal particles to a temperature in the range of about 870° C. to about 930° C. in an atmosphere containing oxygen.

4. In a method for separating solids from a liquefied coal slurry resulting from the solvent refining of coal comprising passing said slurry through a pressure filtration system including a support means to receive a coating of filteraid material thereon capable of retaining solids from said slurry, the improvement which comprises utilizing as the filteraid material in said filtration system finely divided partially devolatilized coal particles wettable by the coal slurry and having a cake density in the range of about 10 lb/ft$^3$ (160.2 kg/m$^3$) to about 16 lb/ft$^3$ (256.3 kg/m$^3$), said partially devolatilized coal particles being prepared by flash heating finely divided thermally expandable coal particles to a temperature in the range of about 870° C. to about 930° C. in an atmosphere containing oxygen, at least a portion of the volatile matter expelled during the partial devolatilization of the thermally expandable coal particles being recovered and recycled to the process for the solvent refining of coal.

5. The method of claims 1, 2, 3 or 4 wherein the flash heating is carried out in an atmosphere containing oxygen in an amount such that there is about 2.0 to about 4.0 standard ft$^3$ of oxygen available per pound (124.9 to 249.7 cm$^3$/g) of thermally expandable coal particles.

6. The method of claims 1, 2, 3 or 4 wherein the same source of thermally expandable coal particles is utilized to produce a feed for the partial devolatilization process and also a feed to the process for the solvent refining of coal.

7. The method of claims 1, 2, 3 or 4 wherein the thermally expandable coal particles are classified to an appropriate particle size range to provide a feed for the partial devolatilization process and also a feed to the process for the solvent refining of coal.

8. The method of claims 1, 2, 3 or 4 wherein the thermally expandable coal particles are milled and classified to a particle size range of about 100 mesh to no more than about 75% below 325 mesh prior to flash heating, the particles larger than said range being further milled to a suitable particle size and utilized in the feed in the solvent refining process, and the particles smaller than said range being directly utilized as SRC feed material.

9. The method of claims 1, 2, 3 or 4 wherein substantially all of the thermally expandable coal particles prior to flash heating have a particle size less than 100 mesh and also about 60% below 325 mesh.

10. The method of claims 1, 2, 3 or 4 wherein the coal used in the solvent refining process is a high volatile coal and the coal used to produce the partially devolatilized coal filteraid material is a medium or low volatile coal.

* * * * *